(12) United States Patent
Lin et al.

(10) Patent No.: US 6,798,664 B2
(45) Date of Patent: Sep. 28, 2004

(54) FRONT PANEL ASSEMBLY FOR COMPUTER ENCLOSURE

(75) Inventors: Wan-Cheng Lin, Tu-Chen (TW); Li-Yuan Gan, Shenzhen (CN); Guang-Yi Zhang, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/295,565

(22) Filed: Nov. 15, 2002

(65) Prior Publication Data

US 2004/0001321 A1 Jan. 1, 2004

(30) Foreign Application Priority Data

Jun. 28, 2002 (TW) ...................................... 91209765 U

(51) Int. Cl.⁷ ................................................ H05K 7/16
(52) U.S. Cl. ...................... 361/727; 361/736; 345/905; 248/917
(58) Field of Search ................................. 361/724–727, 361/679–687, 736, 741; 341/22; 345/168–172, 905; 248/917–924; 364/708.1; 312/223.1–223.6

(56) References Cited

U.S. PATENT DOCUMENTS

| 5,600,538 A | * | 2/1997 | Xanthopoulos | ............. 361/683 |
| 6,445,577 B1 | * | 9/2002 | Madsen et al. | ............. 361/683 |
| 6,590,765 B2 | * | 7/2003 | Crowley | ..................... 361/683 |

* cited by examiner

Primary Examiner—Hung Van Duong
(74) Attorney, Agent, or Firm—Wei Te Chung

(57) ABSTRACT

A front panel assembly includes a front panel (10), a lining panel (30) and a cover (50). An opening (12) is defined in the front panel. A pair of parallel first arcuate guideways (122) is formed on an internal surface of the front panel at upper and lower extremities of the opening. The lining panel is attached to the front panel, includes a central vertical beam (36), and defines a recess (34). A pair of parallel second arcuate guideways (342) is formed at upper and lower extremities of the recess. A plurality of ports or other components is installed in the lining panel at the recess. The cover is received in the recess, and is slidable along the first and second guideways. The cover is slid toward the beam and snappingly engaging therewith, thus protecting the ports or other components in the recess from contamination or accidental damage.

16 Claims, 7 Drawing Sheets

FRONT PANEL ASSEMBLY FOR COMPUTER ENCLOSURE

BACKGROUND OF THE INVENTION

1. Field of the Invention

The present invention relates to computer enclosures, and more particularly to front panel assemblies of computer enclosures which provide access to electronic devices.

2. Description of the Prior Art

With the advent of various new portable universal serial bus (USB) and FireWire technology, users frequently need to plug a device such as a digital camera or an MP3 player into a data storage to download data or upload data. A typical data storage used is a personal computer (PC) that has suitable ports installed at a back panel of an enclosure thereof. However, it is inconvenient for the user to have to reach around to the back of the enclosure. The latest enclosure technology addresses this problem by offering mounting ports in a front panel of the enclosure. Such ports are often protected by a pivotable cover, which helps prevent the ports from sustaining contamination or accidental damage.

Referring to FIGS. 6 and 7, a conventional front panel assembly comprises a front panel 10' and a pivotable cover 20'. A recess 12' is defined behind the cover 12', for accommodating components such as ports secured in the front panel 10'. A pair of pins 14' protrudes inwardly from respective opposite side edges of the front panel 10' at the recess 12'. The cover 20' comprises a pair of connecting portions 22' movably connected to the pins 14'. The cover 20' is pivoted outwardly to expose the recess 12' and gain access to the ports. However, the cover 20' itself is then exposed outside a main face of the front panel 10'. Therefore the cover 20' is itself liable to sustain accidental damage. Furthermore, the pins 14' and connecting portions 22' are prone to wear out after repeated use, and can eventually break.

SUMMARY OF THE INVENTION

Accordingly, an object of the present invention is to provide a front panel assembly which provides access to components, which protects the components, and which has a substantially integrating configuration.

Another object of the present invention is to provide a front panel assembly which is sturdy, durable and shock-resistant.

To achieve the above objects, a front panel assembly for a computer enclosure in accordance with the present invention comprises a front panel, a lining panel and a cover. The front panel has a generally arch-shaped profile. An opening is defined in an upper portion of the front panel. A pair of parallel first arcuate guideways is formed on an internal surface of the front panel, at upper and lower extremities respectively of the opening. The lining panel has a profile generally matching the arch-shaped profile of the front panel, and comprises a central vertical beam. An opening and a recess are defined in the lining panel at opposite sides respectively of the beam. A pair of parallel second arcuate guideways is formed at upper and lower extremities respectively of the recess, corresponding to the first guideways of the front panel. The beam has a slanting edge portion. A plurality of ports or other components is installed in the lining panel at the recess. The cover is received in the recess of the lining panel, and is slidable along the first and second guideways. The cover is slid toward the beam and snappingly engaging with the slanting edge portion of the beam, thus protecting the ports or other components in the recess from contamination or accidental damage.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
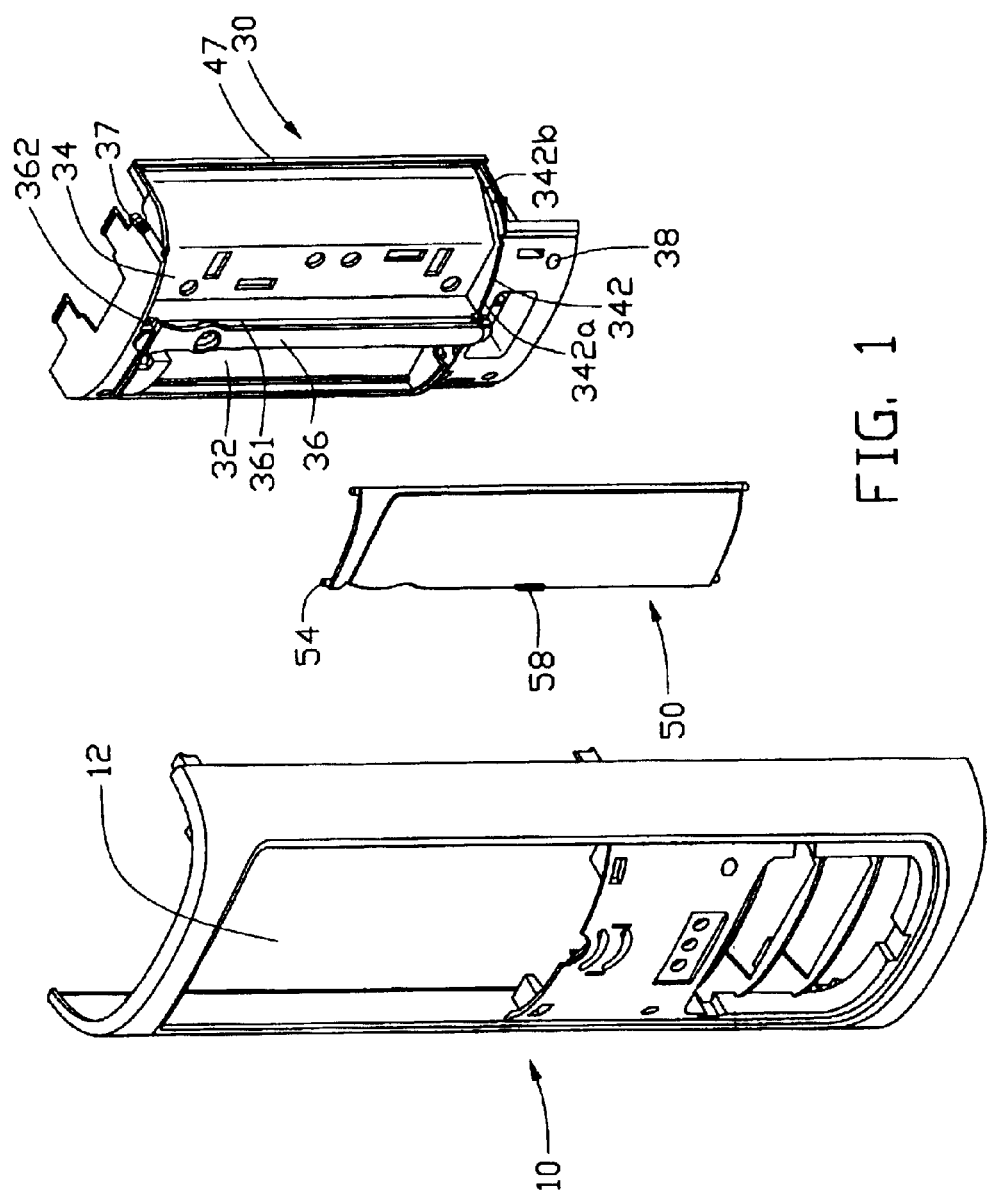
FIG. 1 is an exploded isometric view of a front panel assembly in accordance with a preferred embodiment of the present invention, the front panel assembly comprising a front panel, a cover and a lining panel.
Figure 2:
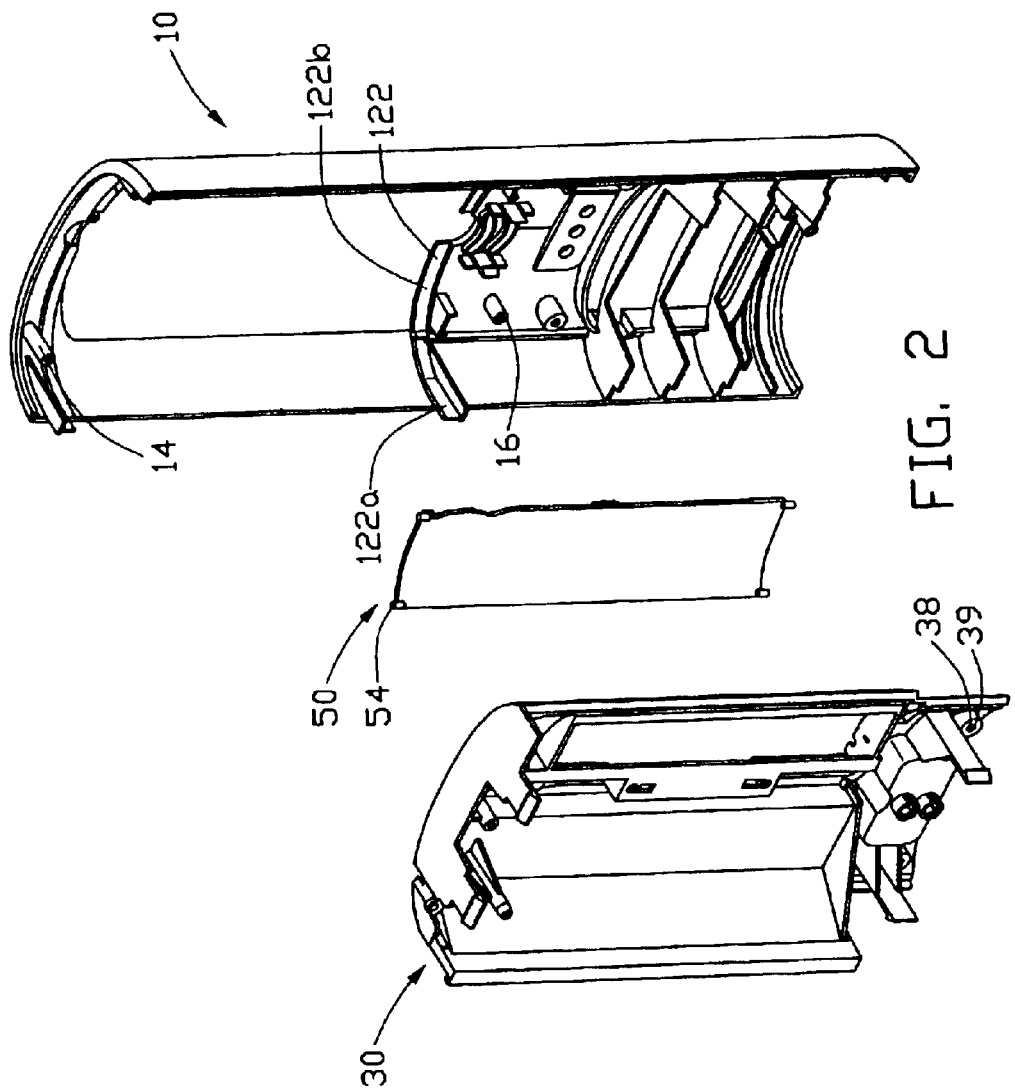
FIG. 2 is similar to FIG. 1, but viewed from a rear aspect.

Referring to FIGS. 1 and 2, a front panel assembly in accordance with a preferred embodiment of the present invention comprises a front panel 10, a lining panel 30 and a cover 50.

The front panel 10 has a generally arch-shaped profile. An opening 12 is defined in an upper portion of the front panel 10. A pair of parallel first arcuate guideways 122 is formed on an internal surface of the front panel 10, at upper and lower extremities respectively of the opening 12. Referring particularly to FIG. 2, each first guideway 122 comprises a rear protruding part 122a and a front recessed part 122b. The recessed parts 122b of the first guideways 122 are respectively located above and below the opening 12. A hollow post 14 extends inwardly from an upper portion of the front panel 10 above the opening 12. The post 14 has an internal thread. A pair of horizontally spaced hollow sockets 16 is inwardly formed from the front panel 10 below the lower of the first guideways 122. A plurality of parallel horizontal louvers (not labeled) is inwardly formed from a lower portion of the front panel 10 below the sockets 16.

The lining panel 30 has a profile generally matching the arch-shaped profile of the front panel 10. The lining panel 30 comprises a central vertical beam 36. An opening 32 is defined in the lining panel 30 at one side of the beam 36, and a recess 34 is defined in the lining panel 30 at an opposite side of the beam 36. A pair of parallel second arcuate guideways 342 is formed at upper and lower extremities respectively of the recess 34, corresponding to the first guideways 122 of the front panel 10. Referring particularly to FIG. 1, the second guideways 342 have contours that are similar to contours of the lining panel 30. Each second guideway 342 comprises a front protruding part 342a and a rear recessed part 342b. The recess 34 is adapted to accommodate the cover 50 therein. The recess 34 is defined between the beam 36 and a vertical stopping portion 47 formed at a rear edge of the lining panel 30. A plurality of holes and/or openings (none labeled) is defined in a portion of the lining panel 30 that is at the recess 34 and adjacent the beam 36, for receiving various ports or other components. A pair of indents 362 is defined in opposite ends of the beam 36 respectively. The indents 362 are respectively in communication with the second guideways 342. A slot (not labeled) is defined in a side surface of the beam 36, in communication with the recess 34. The beam 36 forms a vertical and slanting edge portion 361 that spans between the indents 362. The edge portion 361 is formed at a junction of the slot (not labeled) and the recess 34, and slants progressively rearwardly from the slot (not labeled) toward the recess 34. The opening 32 is adapted to receive a drive such as a hard disk drive. A socket 37 protrudes upwardly from a top portion of the lining panel 30, corresponding to the post 14 of the front panel 10. The socket 37 defines a hole therethrough. Referring to FIG. 2, a pair of spaced sockets 39 is rearwardly formed from a bottom portion of the lining panel 30, corresponding to the sockets 16 of the front panel 10. Each socket 39 defines a hole 38 therethrough.

The cover 50 comprises four pins 54 extending vertically outwardly from four corners thereof respectively. The pins 54 correspond to the first and second guideways 122, 342. A knob 58 is forwardly formed from one vertical edge portion of the cover 50 nearest the beam 36 of the lining panel 30. A slight protrusion (not shown) is rearwardly formed along an entire length of said edge portion of the cover 50, corresponding to the slot (not labeled) of the beam 36.

Figure 3:
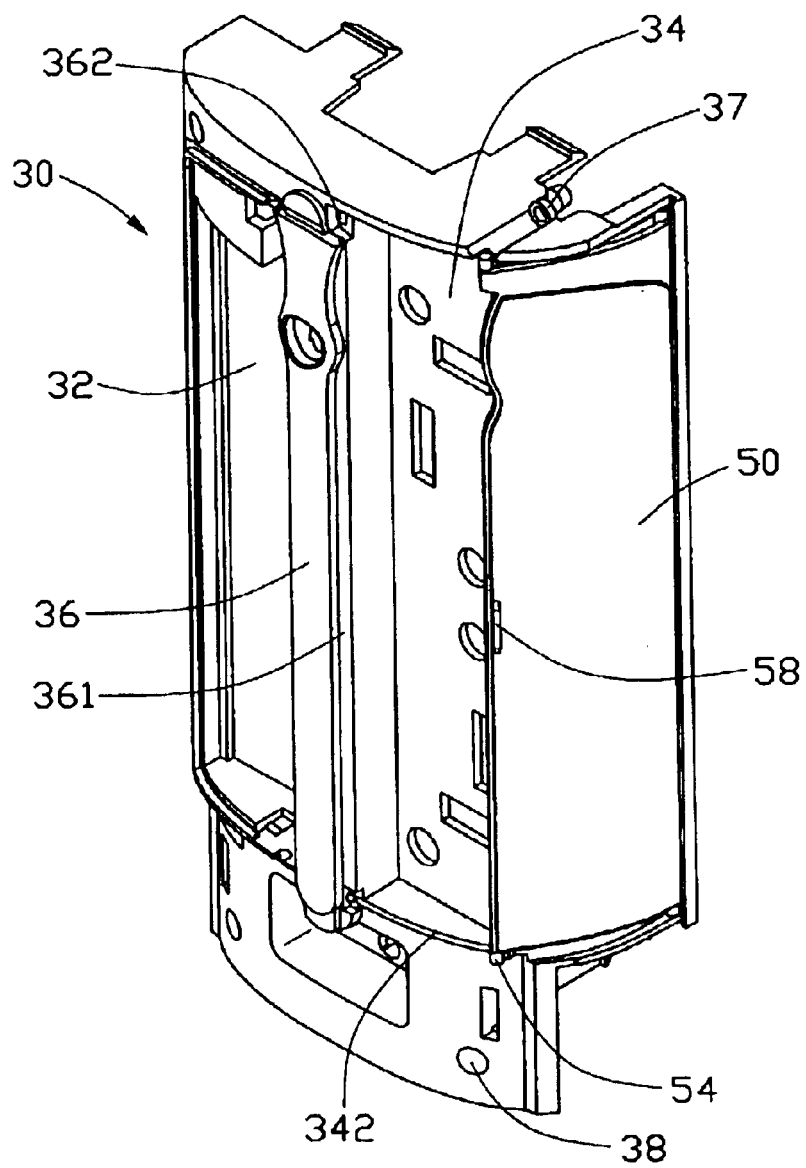
FIG. 3 is an enlarged assembled view of the cover and the lining panel of FIG. 1.
Figure 4:
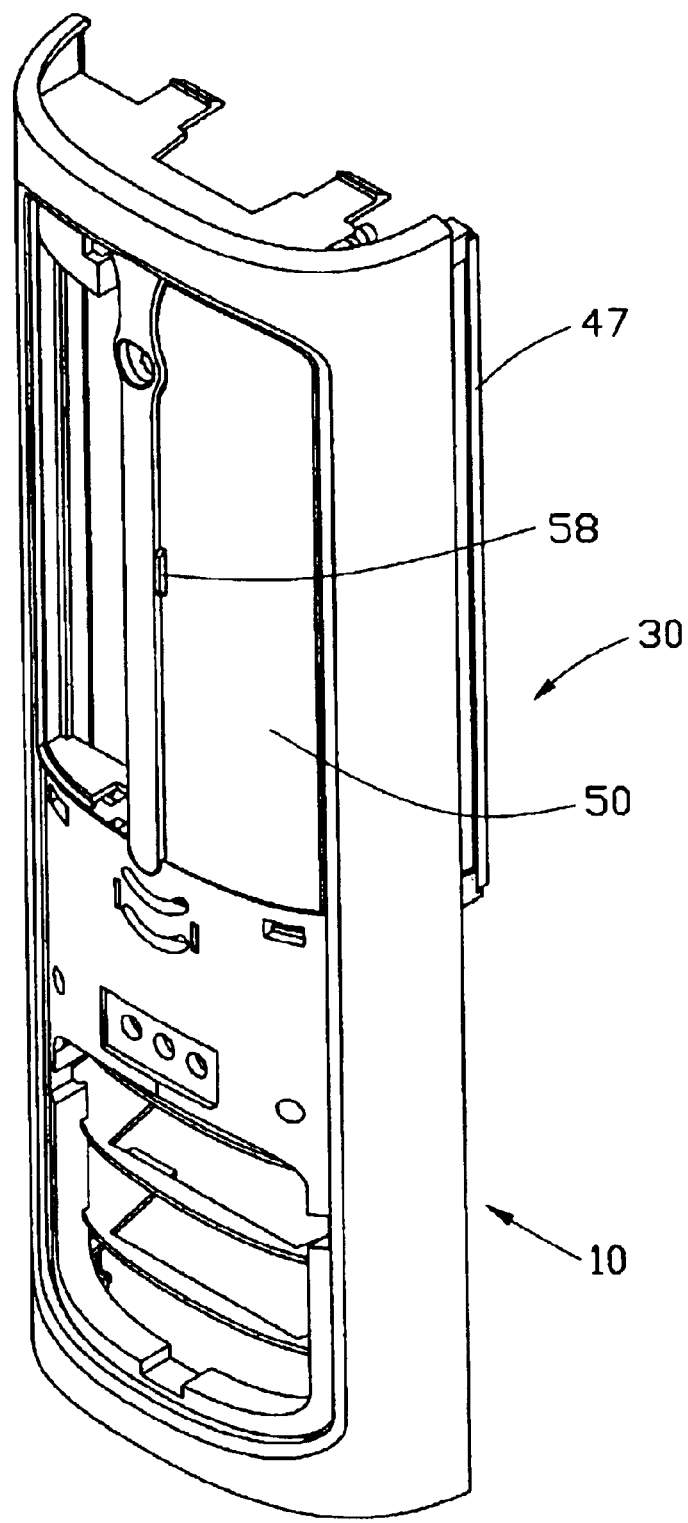
FIG. 4 is an enlarged assembled view of FIG. 1.
Figure 5:
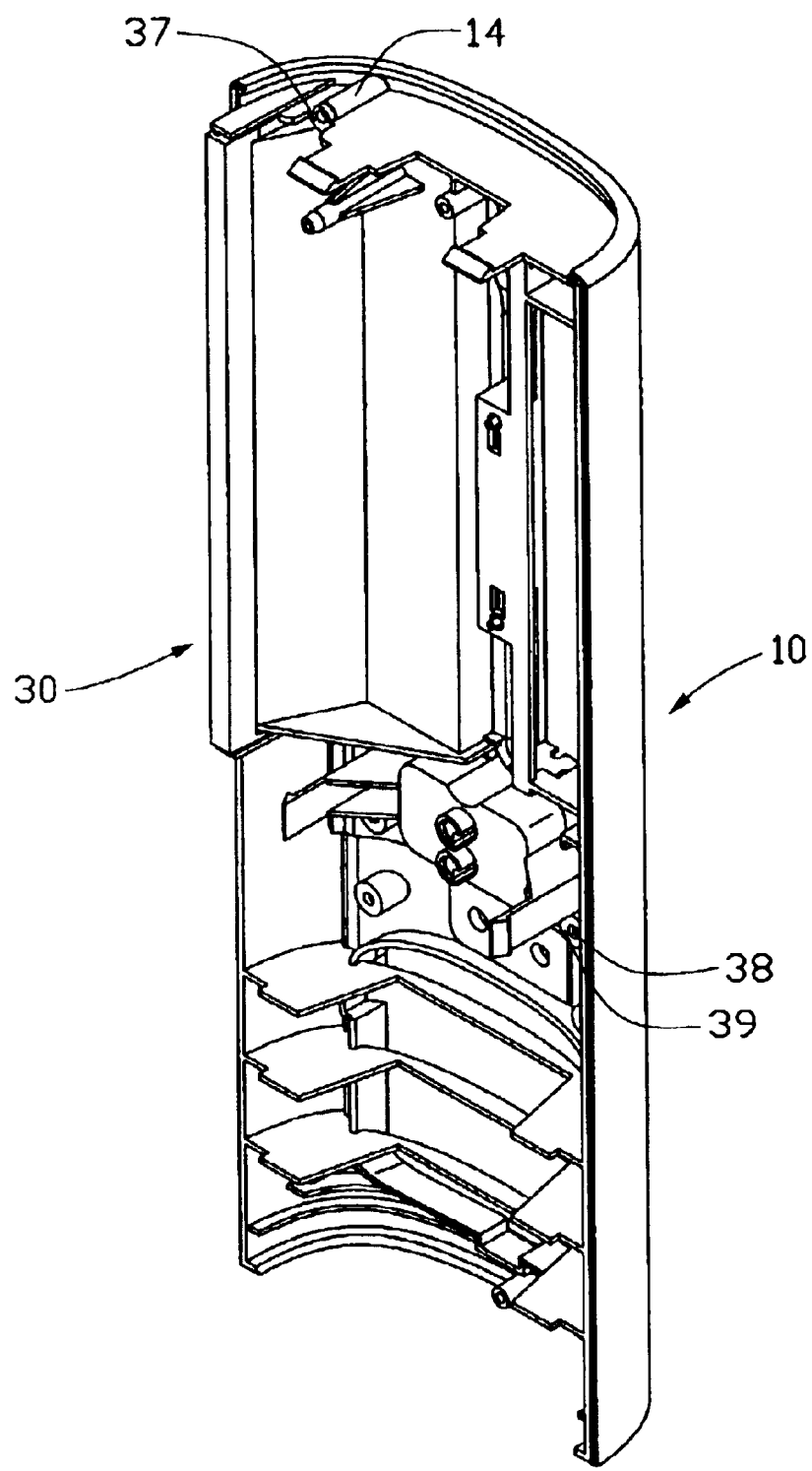
FIG. 5 is similar to FIG. 4, but viewed from a rear aspect.
Figure 6:
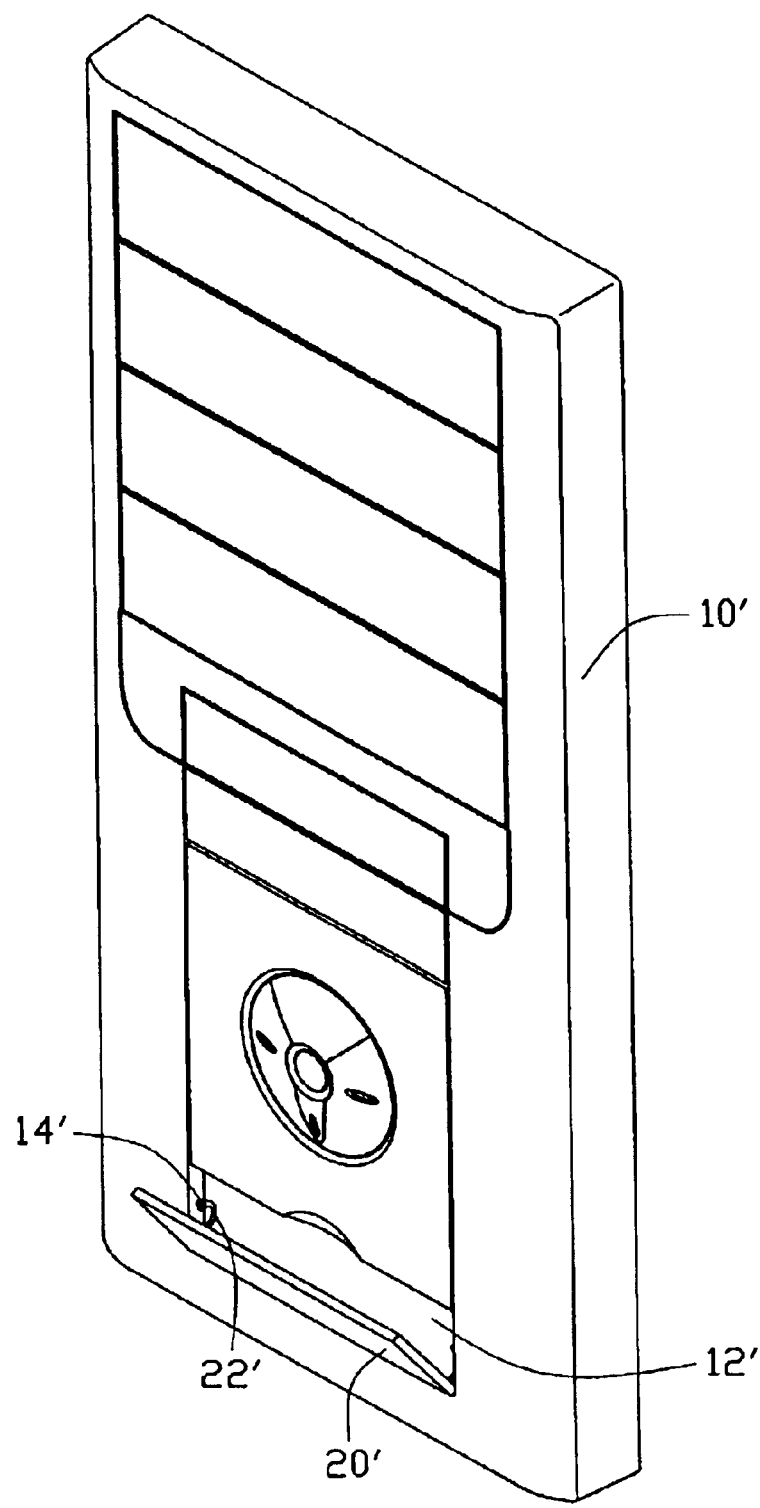
FIGS. 6 and 7 are isometric views of a conventional front panel assembly, respectively showing a cover of a front panel thereof in an open position and in a closed position.
Figure 7:
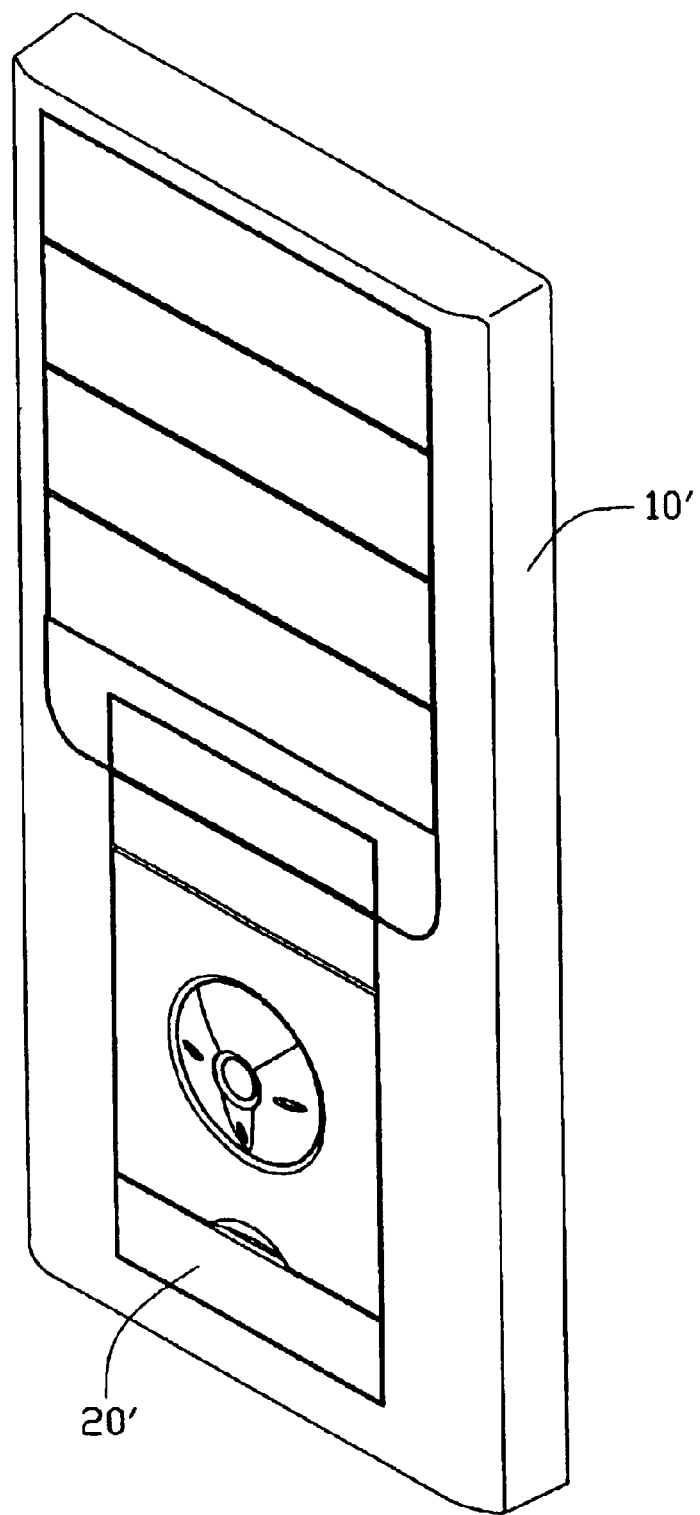

Referring to FIGS. 3, 4 and 5, in assembly, the cover 50 is received in the recess 34 of the lining panel 30. The cover 50 is supported between the second guideways 342, and the stopping portion 47 of the lining panel 30 prevents the cover 50 from slipping out from the recess 34. Then, the combined lining panel 30 and cover 50 is attached to the front panel 10. The socket 37 is attached to the post 14 with a fastener, and the sockets 16 are inserted through the holes 38 of the sockets 39. The opening 32 and said portion of the lining panel 30 that is at the recess 34 and adjacent the beam 36 are exposed to the opening 12 of the front panel 10. Another portion of the lining panel 30 that is at the recess 34 and distal from the beam 36 is shielded behind the front panel 10. The front panel assembly is thus assembled. A space is defined between each first guideway 122 and its adjacent second guideway 342. The pins 54 of the cover 50 are respectively slidably received in the corresponding spaces between the first and second guideways 122, 342, such that the cover 50 can be slid along the first and second guideways 122, 342.

When the ports or other components installed at the recess 34 are not in use, the knob 58 together with the cover 50 is slid toward the beam 36. The pins 54 slide along the first and second guideways 122, 342, until two leading pins 54 are received in the indents 362 respectively, and the protrusion of the cover 50 is snappingly engaged with the slanting edge portion 361 of the beam 36 in the slot (not labeled). At this stage, the cover 50 is defined to be in a first, closed position. The recess 34 is covered by the cover 50, thus protecting the ports or other components from contamination or accidental damage. To accessing the ports or other components in the recess 34, the knob 58 is pulled outwardly to disengage the cover 50 from the beam 36. Then the cover 50 is slid away from the beam 36 until the cover 50 is hidden behind the front panel 10. The recess 34 is thus fully exposed. At this stage, the cover 50 is defined to be in a second, open position.

While the present invention has been illustrated by the description of the preferred embodiment thereof, and while the embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

What is claimed is:

1. A panel assembly for a computer enclosure, the panel assembly comprising:
   a first panel defining an opening;
   a second panel attached to the first panel, the second panel comprising a beam and defining a recess corresponding to the opening, the second panel and the first panel cooperatively forming at least one guideway; and
   a cover received in the recess, the cover being slidable along the at least one guideway and snappingly engagable with the beam.

2. The panel assembly as claimed in claim 1, wherein the first panel has a generally arch-shaped profile, and a pair of first arcuate guideways is formed on an internal surface of the first panel.

3. The panel assembly as claimed in claim 1, wherein the beam has a slanting edge portion for snappingly engaging with the cover, and a knob is forwardly formed at the cover.

4. The panel assembly as claimed in claim 1, wherein a plurality of holes and/or openings is defined in the second panel at the recess, for receiving ports and/or other components.

5. The panel assembly as claimed in claim 1, wherein a plurality of sockets is arranged on the first panel, and a plurality of sockets is arranged on the second panel engaging with the sockets of the first panel.

6. The panel assembly as claimed in claim 2, wherein a pair of second arcuate guideways is formed on the second panel, and the cover is slidable along the first and second guideways.

7. The panel assembly as claimed in claim 6, wherein four pins extend from the cover, and the pins are slidable along the first and second guideways.

8. The panel assembly as claimed in claim 4, wherein a pair of indents is defined in opposite ends of the beam respectively, for receiving corresponding pins of the cover.

9. A front panel assembly comprising:
   a front panel defining an opening, and comprising a pair of first guideways at an internal side thereof;
   a lining panel attached to the front panel, the lining panel defining a recess and comprising a pair of second guideways corresponding to the first guideways of the front panel, the recess comprising a first portion in communication with the opening of the front panel and a second portion offset from said opening; and
   a cover received in the recess and comprising a plurality of pins;
   wherein the pins are movably received between the first and second guideways such that the cover is slidable between a first position where the cover covers the first portion of the recess and a second position where the first portion of the recess is exposed to the opening of the first panel.

10. The front panel assembly as claimed in claim 9, wherein each of the first guideways is arcuate, and comprises a protruding part and a recessed part.

11. The front panel assembly as claimed in claim 9, wherein a pair of indents is defined in opposite ends of the lining panel, for receiving corresponding pins of the cover when the cover is in the first position.

12. The front panel assembly as claimed in claim 9, wherein the lining panel comprises a slanting edge portion snappingly engaging with the cover when the cover is in the first position.

13. The front panel assembly as claimed in claim 9, wherein a plurality of openings and/or holes is defined in the lining panel at the first portion of the recess, for receiving ports and/or other components.

14. The front panel assembly as claimed in claim 9, wherein a plurality of sockets is arranged on the front panel, and a plurality of sockets is arranged on the lining panel engaging with the sockets of the front panel.

15. The front panel assembly as claimed in claim 10, wherein each of the second guideways is arcuate, and comprises a protruding part and a recessed part.

16. A front panel assembly comprising:

a first panel defining a lengthwise direction and an opening extend therethrough in a front-to-back direction perpendicular to said lengthwise direction;

a second panel having a dimension similar to that of the opening and attached to the first panel, the second panel defining a recess corresponding to the opening in said front-to-back direction, the second panel and the first panel cooperatively defining therebetween at least one transverse guideway; and a rigid cover received in the recess, the cover being curvedly slidable along the at least one transverse guideway; wherein said cover is moved curvedly around a vertical axis in said lengthwise direction to define open and closed positions relative to the first panel, wherein the cover is generally parallel, in the lengthwise direction, hidden behind the first panel when the cover is located in the open position.

* * * * *